United States Patent

Ginzboorg

[11] Patent Number: 6,141,410
[45] Date of Patent: Oct. 31, 2000

[54] ROUTING TRAFFIC IN A NODE OF A TELECOMMUNICATION NETWORK

[75] Inventor: Philip Ginzboorg, Helsinki, Finland

[73] Assignee: Nokia Telecommunications Oy, Espoo, Finland

[21] Appl. No.: 08/930,930
[22] PCT Filed: Apr. 9, 1996
[86] PCT No.: PCT/FI96/00186
  § 371 Date: Oct. 10, 1997
  § 102(e) Date: Oct. 10, 1997
[87] PCT Pub. No.: WO96/32821
  PCT Pub. Date: Oct. 17, 1996

[30] Foreign Application Priority Data

Apr. 10, 1995 [FI] Finland ................. 951703

[51] Int. Cl.[7] ................. H04M 7/00
[52] U.S. Cl. ................. 379/221; 379/219; 379/220; 379/14
[58] Field of Search ................. 379/221, 219, 379/220, 242, 243, 244, 245, 14, 113, 111, 207

[56] References Cited

U.S. PATENT DOCUMENTS

| 4,669,113 | 5/1987 | Ash et al. | 379/221 |
| 4,885,780 | 12/1989 | Gopal et al. | 379/221 |
| 4,979,118 | 12/1990 | Kheradpir | 379/221 |
| 5,086,460 | 2/1992 | Ash et al. | 379/221 |
| 5,130,982 | 7/1992 | Ash et al. | 370/352 |
| 5,291,550 | 3/1994 | Levy et al. | 379/221 |
| 5,377,262 | 12/1994 | Bales et al. | 379/220 |
| 5,402,478 | 3/1995 | Hluchyi et al. | 379/221 |
| 5,848,055 | 12/1998 | Fedyk et al. | 370/228 |

FOREIGN PATENT DOCUMENTS

| 559 979 | 9/1991 | European Pat. Off. . |
| 94/11996 | 5/1994 | WIPO . |

Primary Examiner—Krista Zele
Assistant Examiner—Benny Q. Tieu
Attorney, Agent, or Firm—Pillsbury Madison & Sutro

[57] ABSTRACT

A method and system for routing traffic in a node of a telecommunications network, in which the node receives traffic units to each of which is connected given call attributes on the basis of which the routing is carried out, and a suitable alternative is selected from among several possible traffic control alternatives, whereby a set of attributes is allocated to each alternative for the selection and an attribute is matched with the call attribute corresponding to it when testing the suitability of the alternative for the traffic unit. A set of selection policies and the order in which they are used are specified for the selection, each selection policy specifying at least the available alternatives and the order in which said alternatives are selected for testing, whereby the suitability of the alternatives is tested in the order specified by the selection policy. A set of attributers is also associated with the selection policy and when it is time to use the selection policy, each attribute is matched with the call attribute corresponding to it, whereby it depends on the results of the matchings if the selection policy is started, and when the set is empty, the selection policy is started as soon as it is time to use it

13 Claims, 15 Drawing Sheets

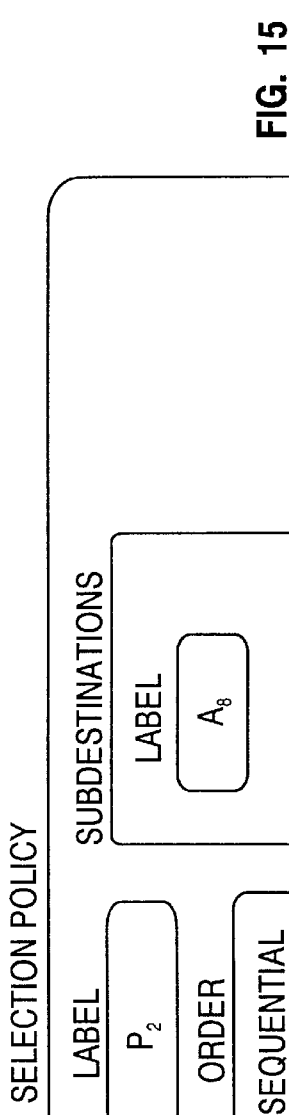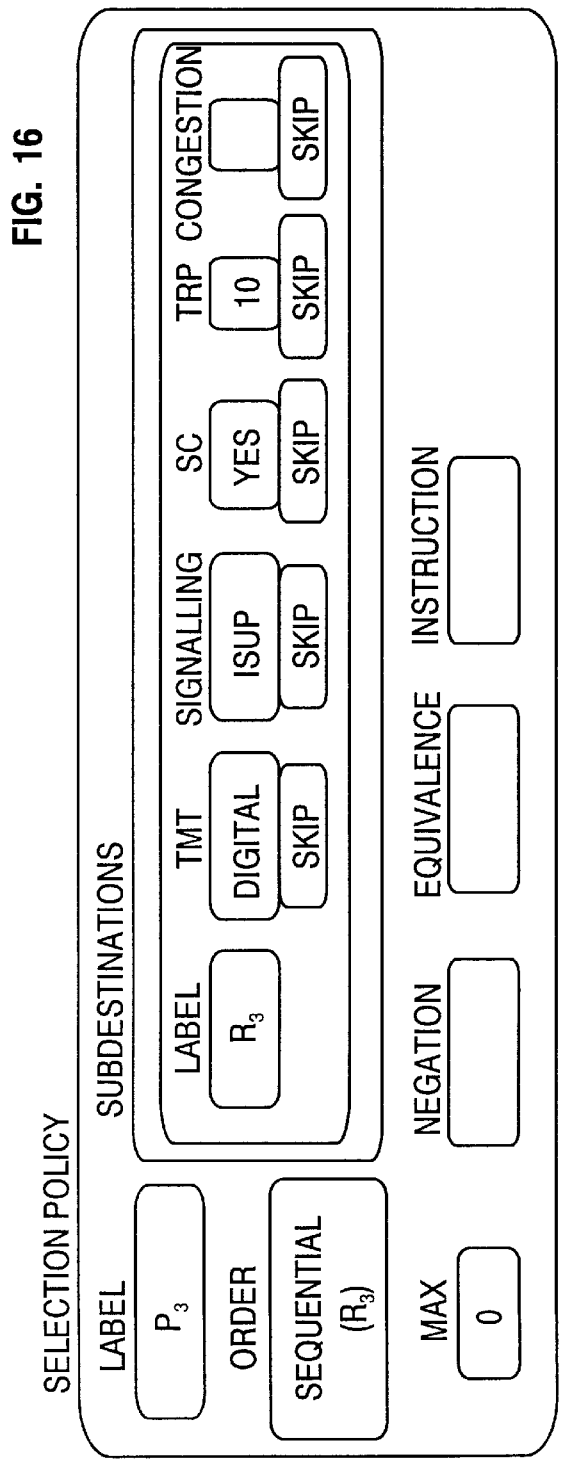

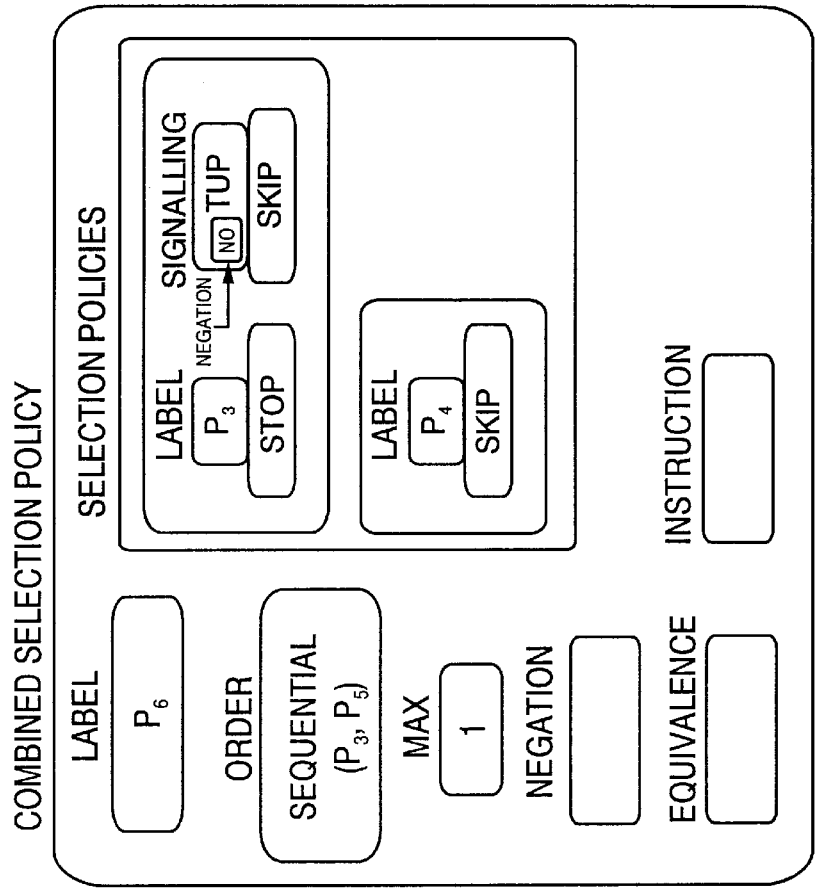
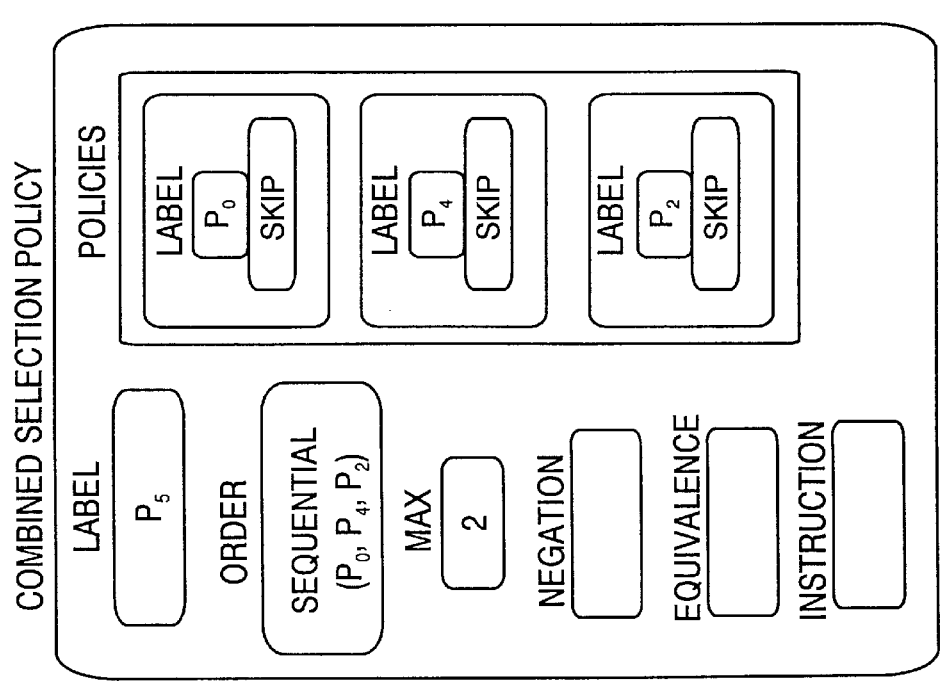
FIG. 18
FIG. 19

ROUTING TRAFFIC IN A NODE OF A TELECOMMUNICATION NETWORK

This application is the national phase of international application PCT/FI96/00186, filed Apr. 9, 1996 which designated the U.S.

BACKGROUND OF THE INVENTION

The invention relates to a method according to the preamble of appended claim 1 and a system according to the preamble of appended claim 9 for routing traffic in a node of a telecommunication network. The solution according to the invention is intended to be used especially in an exchange for routing calls made by users of a telephone network towards a desired subscriber (the called subscriber).

When a subscriber of a telephone network makes a call, the destination assigned for the call is determined in the exchange in accordance with the numbers selected by the subscriber. Each node of the telephone network finds out the destination of the incoming call by analyzing the selected numbers. In order that each node could forward calls, given information is transmitted relating to each call attempt, which information will in the following be referred to as call attempt data. The call attempt data includes e.g. the calling address, the called address and information on what kind of transfer media is required by the call in question.

The same destination can generally be reached along several alternative paths. A set of alternative paths typically correspond to a given destination in a transit exchange. Until an exchange can start operating, its routing functions must be established: routes are to be created, routes are to be grouped into destinations and digit analyses are to be created for providing the desired destinations as results.

Although the destination can be reached by using several alternative paths, some of the paths are shorter than the others. As it is preferable to route calls along the shortest (direct) route, routing is often carried out in such a manner that direct alternatives are tested first.

Routing functions typically carried out in an exchange are illustrated in FIG. 1 in a somewhat clarified way. The routing principle is hierarchical in such a manner that origin and digit analyses are carried out at the beginning on the basis of information on the calling subscriber and the selected numbers. The origin analysis is carried out to find out the information relating to the origin of the call. The information concerning the subscriber may be e.g. the origin of the incoming route (or circuit) and the subscriber class of the calling subscriber. Thus the same selected digit series received from different incoming circuit groups or from subscribers belonging to different classes may lead to a different result. The destination is obtained as a result of the analyses conducted. For example, there may be 65,000 destinations in the Applicant's DX 200 exchange each of which can contain 5 subdestinations. Subdestinations are typically divided into three main classes: connections directed to another exchange, subscriber lines in the same exchange and service triggers that initiate some service. A service of this kind can be of a very simple type, e.g a voice message delivered to the subscriber or a more complicated service that requires a conversation with a more remotely situated database (such as the service control point SCP in an intelligent network or the HLR register in the GSM network).

The destination also includes a so-called charging index which is supplied to the charging analysis (not shown in the figure).

One destination typically contains information on several, e.g. five different subdestinations. The subdestinations can be arranged within the destination into a given priority order in such a manner that one of them is the main alternative for routing. If e.g. a congestion is detected on the first subdestination, the call can be transferred to some other subdestination.

Each subdestination is further connected to one outgoing or internal route. The circuit groups associated with the desired route are tested after this in a given order to find an idle circuit. At this context a circuit refers to a combination of two transmission channels which enables a bidirectional transmission of signals between subscribers. A circuit group refers to a set of circuits with a similar purpose of use. The circuits of the circuit group have similar signalling properties.

The present invention relates to a routing hierarchy as described above and especially to the selection functions with which an alternative is selected from among many possible alternatives, such as the selection of a subdestination from among several alternative subdestinations in a destination.

When a call arrives at an exchange, the exchange generates a copy of the call control program and supplies it to be used by said call. The call control program calls routing functions. The call control attends to the call until it is terminated, whereby the copy is destroyed.

FIG. 2a illustrates these functions and in what way digit analysis and subdestination search is part of the processing of a call. A call control block CC supplies control information (containing e.g. said number and information with which analysis tree the digit analysis is to be carried out) to a digit analysis block DA that returns to the call control block information on the destination corresponding to the selected numbers. The destination refers at this context to a set of traffic control alternatives (i.e. subdestinations) that have been found on the basis of the digit analysis and other information, such as the subscriber class and the incoming circuit group. The call control block will forward these alternatives to the route selector RS that carries out an analysis of its own and returns the result to the call control block CC. This result is the subdestination mentioned above. The selection process employs data associated with a call attempt which data is known to the call control block CC. As digit analysis is not relevant to the present invention and as it can be carried out in a manner known per se, it will not be described in more detail herein. Digit analysis is described in more detail e.g. in Finnish Patent Application FI-943060.

An exchange is an expensive portion of a network and its useful life can generally be measured in decades. In the course of such a long time it may become necessary for various reasons to change the operation of the exchange. The needs for change may come from two different directions for the routing functions of an exchange:

1. The increase in the number of network services causes needs for change. As the number of services increases, there will also be an increase in the number of the parameters which have to be checked in connection with routing and which will have an effect on the result of routing.

2. Expenses are saved by dynamic routing methods that automatically adapt routing to the network mode. The use of such methods requires changes in the routing functions.

It is, however, quite difficult to change routing methods as the changes will have an effect on many different parts in the whole process. Therefore it will take quite a long while until the operator will obtain the desired changes from the manufacturer of the exchange.

BRIEF SUMMARY OF THE INVENTION

The object of the present invention is to amend the disadvantage mentioned above by creating a new kind of routing solution that will enable more flexible changes in the routing process. This object is achieved with the solutions according to the invention of which the method is characterized by what is described in the characterizing part of appended claim 1 and the system is characterized by what is described in the characterizing part of appended claim 9.

The idea of the invention is to use routing based on attributes, the routing comprising one or more attributes that are associated with alternatives and matched with a corresponding call attribute in order to evaluate the suitability of the alternative, and to specify a set of selection policies for routing and the order of use of the policies, a single selection policy including different alternatives and their mutual selection order. Also, one or more attributes may be associated with the selection policy, whereby the use of said selection policy requires that the matching of all the attributes associated with it is successful. A single alternative may also be another selection policy for which alternatives of its own are specified.

On account of the solution according to the invention, the character of the routing process can be changed flexibly and fast. The manufacturer of the exchange can provide the teleoperator with a set of "building blocks" (attributes and selection policies) by means of which the teleoperator can flexibly modify the behaviour of routing. Due to the faster and easier possibilities for change than before, the solution according to the invention provides the teleoperator with a possibility to offer a better service to clients, which is most important in a situation in which competition in the telecommunication field has become free and the operators are constantly on the lookout for new ways of competing.

The advantage of the solution according to the invention can in principle be also seen in that it allows routing changes only by changing data, whereas according to prior art changes have been required to be made to the routing program at the exchange. Because of this primary difference, the maintenance of the route selector machine according to the invention is less complicated than before. Therefore the method is especially suited to be applied to various routing processes, such as dynamic routing in which the best traffic control alternative changes as the traffic and the network mode is changing.

BRIEF DESCRIPTION OF THE SEVERAL VIEWS OF THE DRAWING

In the following, the invention and its preferred embodiments are described in more detail with reference to the examples according to the appended drawings, in which FIG. 15 illustrates routing that always leads to a delivery of a voice announcement, FIG. 16 illustrates routing in which only one of the subdestinations shown in FIG. 7 is tested, FIG. 18 illustrates routing in which three different selection policies are used, FIG. 19 illustrates routing in which a special service is offered for ISDN calls.

DETAILED DESCRIPTION OF THE INVENTION

Figure 1:
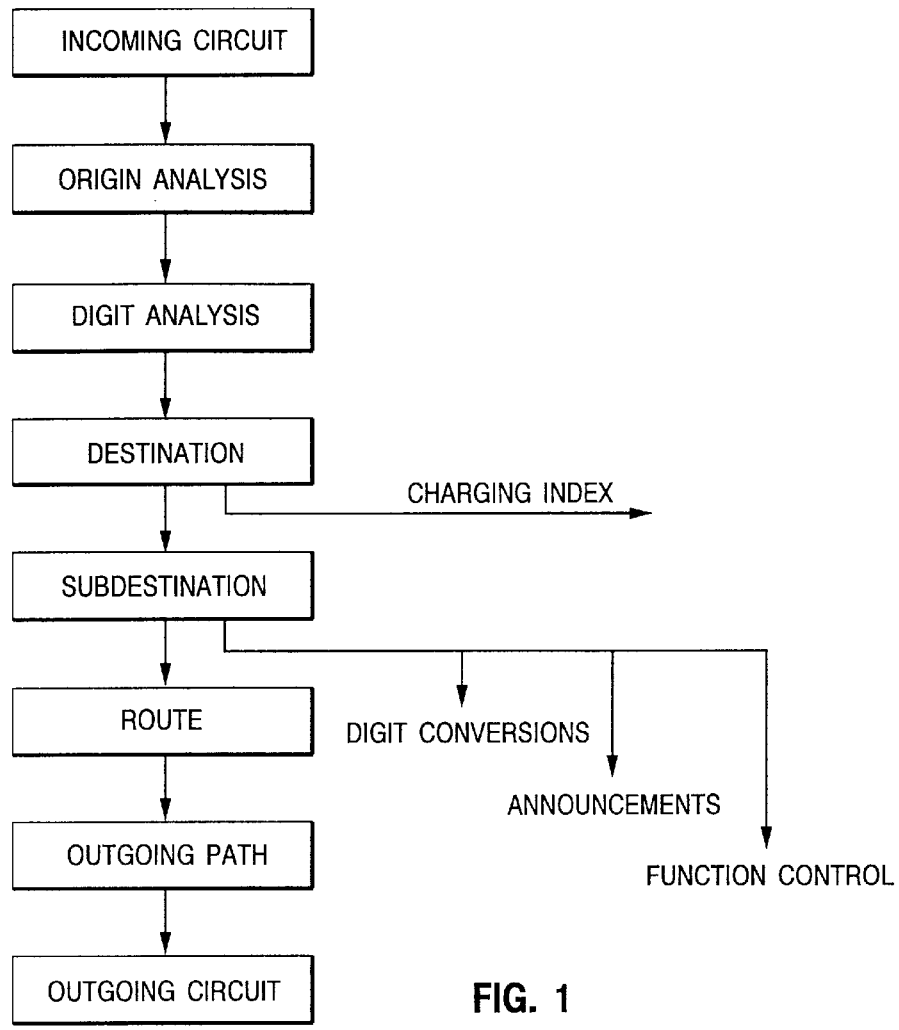
FIG. 1 shows the hierarchy of routing functions of an exchange.

In the following an example is still given of a situation in which a subdestination has to be selected for a call from among several alternatives. It should be noted that the method according to the invention could also be utilized on several other hierarchy levels shown in FIG. 1 on which levels the correct alternative has to be similarly searched from among several different alternatives.

In accordance with the present invention there is a set of alternatives on each subdestination of the node, the attributes describing the properties of the subdestination or more accurately the conditions that have to be true in order that the subdestination (alternative) could be selected. In an extreme case said set may consist of just one (or zero) attribute. In a routing process the attributes are checked in order to see if the subdestination is suitable for the call attempt at that moment. The call attempt data is also divided into different attributes which are compared with the subdestination attributes to ascertain their suitability. These attributes in the call attempt data will in the following be referred to as call attributes in order to distinguish them from attributes associated with alternatives (subdestinations). (That is, if in the following only attributes are mentioned, they refer to attributes associated with different alternatives, in this case to subdestinations.) It should be noted that the designation "call attribute" covers at this context even attributes that are not directly related to call attempt data, but a call attribute may also be an attribute relating to the environment of the call, such as the time of the day when the call attempt is made or the loading of the exchange, for example. The concept "call attempt" will be described in more detail below in connection with FIG. 2b.

The subdestination attributes can be of a permanent type (such as "signalling type" or "satellite link") or temporary (such as "the load at the moment" or "congestion"). The attribute set related to the subdestination varies according to the type of subdestination. For example, it is appropriate to check "the signalling type" before the call is transferred to the next exchange (the subdestination is a connection to the next exchange), but it is not appropriate if the call terminates with a voice announcement supplied to the subscriber (the subdestination leads to the announcement service, cf. FIG. 1).

Before the routing functions of the call can be started, it has to be decided in which order the alternative subdestinations will be checked. If the selected subdestination is not suitable (e.g. because of congestion) for the call, another subdestination will be selected for checking. If none of the subdestinations is suitable, routing will fail. The selection order of the subdestinations may be, for example, one of the following:

1. A sequential order in which the subdestinations are checked in the order specified by the operator.

2. A cyclic order which is similar to the sequential order but the starting point is not fixed (the starting point may be the subdestination selected last, for example).

3. A random order in which the subdestination to be checked is selected at random and each subdestination has an equal probability of being selected.

4. An order based on percentage proportions in which the subdestinations are selected at random, but each subdestination has a predetermined (specified by the operator) probability of being selected.

5. A combined method in which the destination is divided into a set of subdestinations. Within each set the way of selection is one of the above mentioned. The selection of the set is carried out separately by means of one of the methods mentioned above (e.g. in sequential order).

The set of alternatives and the selection order together form a generic "selector component" according to the invention, which will in the following be referred to as a selection policy. A set of selection policies and the order in which they are used are determined for the selection. As will be described below, the conditions (attributes) may also be connected to selection policies and an alternative contained in a selection policy may also be another selection policy.

After one of the alternatives (subdestinations) has been selected for testing in the routing procedure, the process continues with a matching of its attributes. Matching is a test by which the suitability of the attribute for the call in question is tested. Matching is performed by calling a matching operation corresponding to said attribute. The nature of the matching operation depends on the attribute but the result of matching has to always be either "true" (T) or "false" (F), that is, a success or a failure. The matching operation is therefore a Boolean function. The attribute entails a certain (Boolean) condition and the matching means that the operation corresponding to the attribute is used for testing if the condition is true or false. If the matching of all the attributes is successful (whereby the result of matching is true), the subdestination is returned to the call control as a result and the selection process is abandoned (the other possibly remaining alternatives will thus not be tested any more).

Figure 2A:
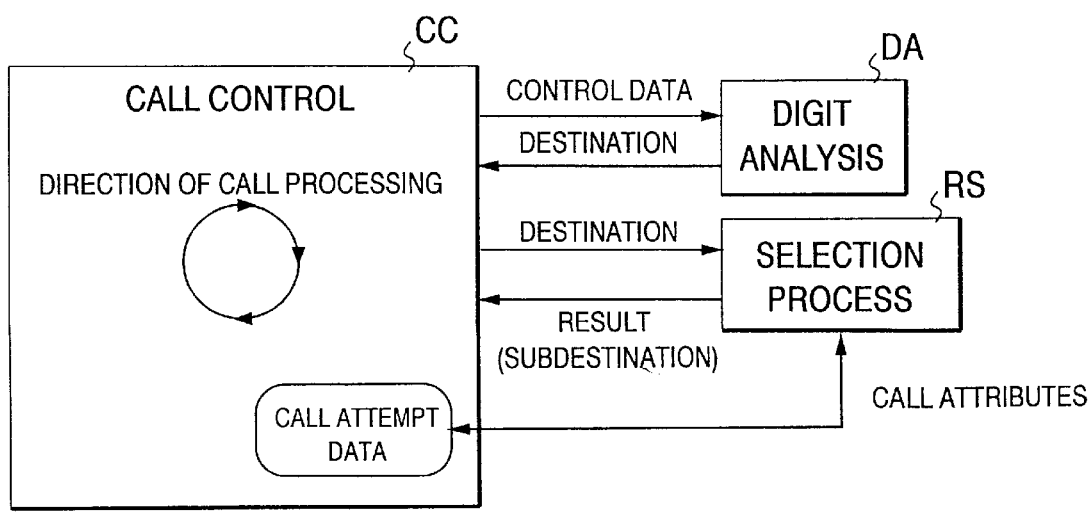
FIG. 2a illustrates routing as part of the processing of a call.
Figure 2B:
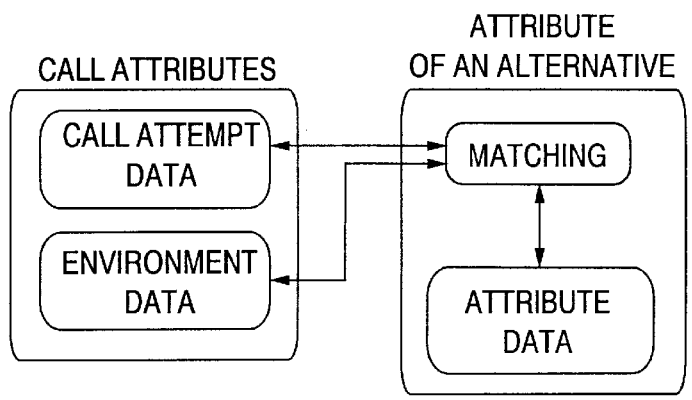
FIG. 2b illustrates the performance of a matching operation.

In FIG. 2b the performance of a matching operation is illustrated by showing the sources from which the matching operation obtains the necessary information for carrying out the matching. The matching can be carried out by using sources which are (a) call attempt data, (b) attribute data and (c) data related to the environment of the call. Both call attempt data and data related to the environment contain attributes that are herein referred to as "call attributes". As was put forth above, the call attribute related to the environment of the call can describe the time of the day relating to the call attempt or the loading of the exchange, for example. The call attributes thus describe the call and its "environment" and the attributes conditions related to the alternatives that have to be true in order that said alternative could be selected.

In the following, a description is given of the hierarchical model of the route selector machine according to the invention and the routing carried out by means of the route selector machine.

Figure 3A:
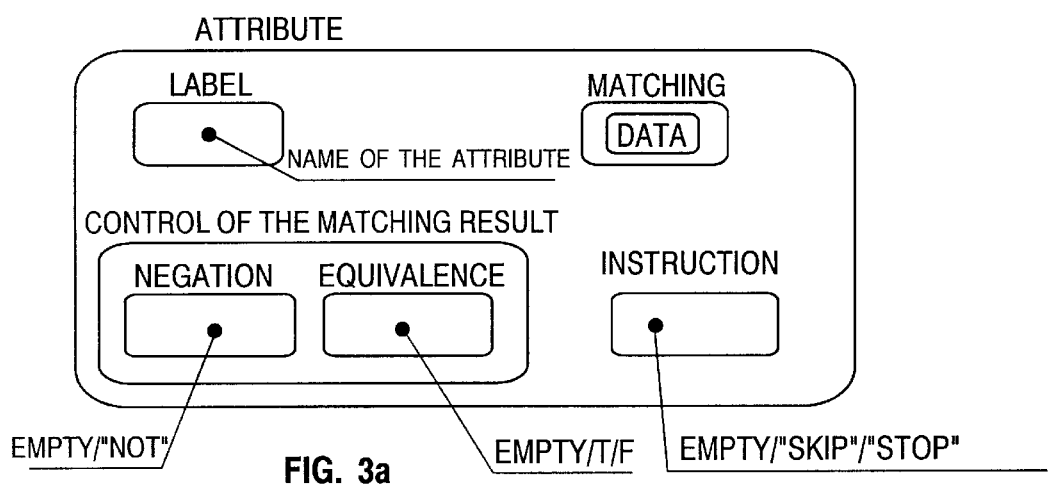
FIG. 3a illustrates an attribute to be used in a selection machine.

The above mentioned attribute constitutes the foundation of the model (the lowest hierarchy level) with which a given condition and a given matching operation are associated. FIG. 3a illustrates one attribute and the elements related thereto. First of all, the attribute contains a label indicating which attribute it concerns (the name of the attribute). The label consists of three parts: (a) the name of the attribute (alphanumeric characters), (b) the type of the attribute and (c) the unique identifier of the attribute (which is a pointer number addressing a corresponding record in the routing database.) The attribute further contains the matching operation (which is indicated by a matching field in the figure) to which a given operation is related, that is, a Boolean function which means that its result can only be T (success) or F (failure), and a given condition to be tested by said function.

The attribute further contains control information of the matching result, that is, negation and equivalence by means of which the matching result can be controlled. The negation field may either be empty or its value may be T (true) which denotes a logical not-operation (i.e. negation). By means of the latter, the matching result may be converted into the opposite. The default value of the negation field is "empty". The value of the equivalence field can either be "empty", T (true) or F (false) and the object is to enable the forcing of the matching result to the desired value. The performance of matching can thus be passed by inserting the value T or F into the equivalence field, whereby the result of the matching can be read directly from the field. The value of the equivalence field does not cancel negation; for example, if the value of negation is T and equivalence is F, the matching result is "NOT F", i.e. T. The default value of the equivalence field is "empty".

The attribute also contains an instruction field by means of which the selection of the subdestination is controlled. The value of the data in the instruction field may be "empty", "skip" or "stop". These values determine what will be done if the matching fails: the value "skip" indicates that the subdestination (alternative) has been checked and then the next subdestination is checked and the value "stop" ends the selection process in a failure. In the last-mentioned case the call is disconnected. It can be determined by means of the instruction field how the selection process is to proceed after the matching fails (the result of the matching is false).

A matching result from the matching of more than one attribute is obtained when the results of single matching operations are combined by logical AND operations. When the final matching result is F (failure), it may be a result of a failure of only one single matching or of more than one matching. If more than one matching has been failed, the contents of the instruction fields related to them can be mutually different. In this case "stop" is the final procedure, that is, "stop" is a more powerful command than "skip".

Figure 3B:
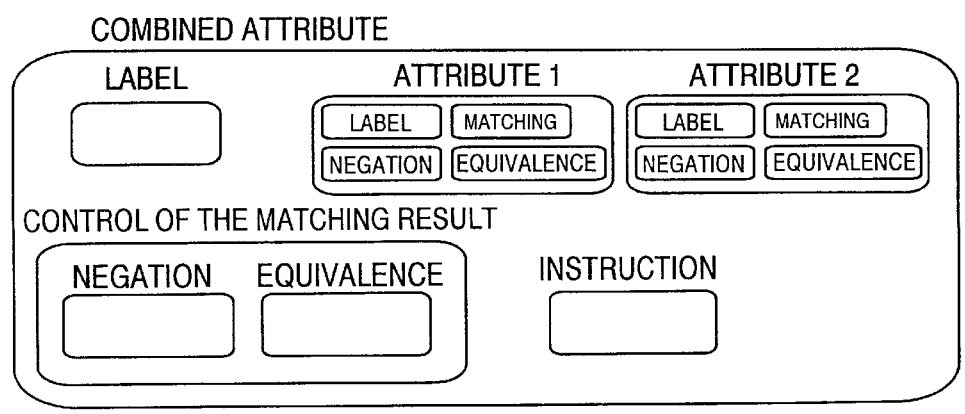
FIG. 3b illustrates a combined attribute to be used in a selection machine.

The combination of attributes forms new attributes which can also be examined as one object. In a combined attribute the final result of the matching is determined by the combination of the matching results of the components (the matching results of the components are combined by logical AND operations). FIG. 3b shows a combined attribute that comprises a label, control fields of the matching result (negation and equivalence) and an instruction field just as other attributes do. The data of the combined attribute comprises a set of other attributes (actually the set consists of pointers that address those attributes in a common attribute list stored into the routing database that are related to the combined attribute) in the example of FIG. 3b the set includes two attributes. The instruction fields of single attributes are not significant in this case, but when the matching fails, the instruction field of the combined attribute will determine what will be done.

For example, a condition comprising two different subconditions (C1 and C2) and an OR function connecting them can be realized by means of a combined attribute. By virtue of the known De Morgan's law C1 OR C2=not (notC1 AND notC2), wherefore setting the value "not" both on the negation fields of attributes corresponding to the subconditions and on the negation field of the combined attribute, a condition can be realized, the matching of which will be successful if at least one of the subconditions (C1 or C2) is true.

The next object in the route selector machine hierarchy is the above-mentioned selection policy that comprises at least a set of possible subdestinations (the subdestinations in the destination) and the order in which the subdestinations are selected from the set for checking.

Figure 4A:
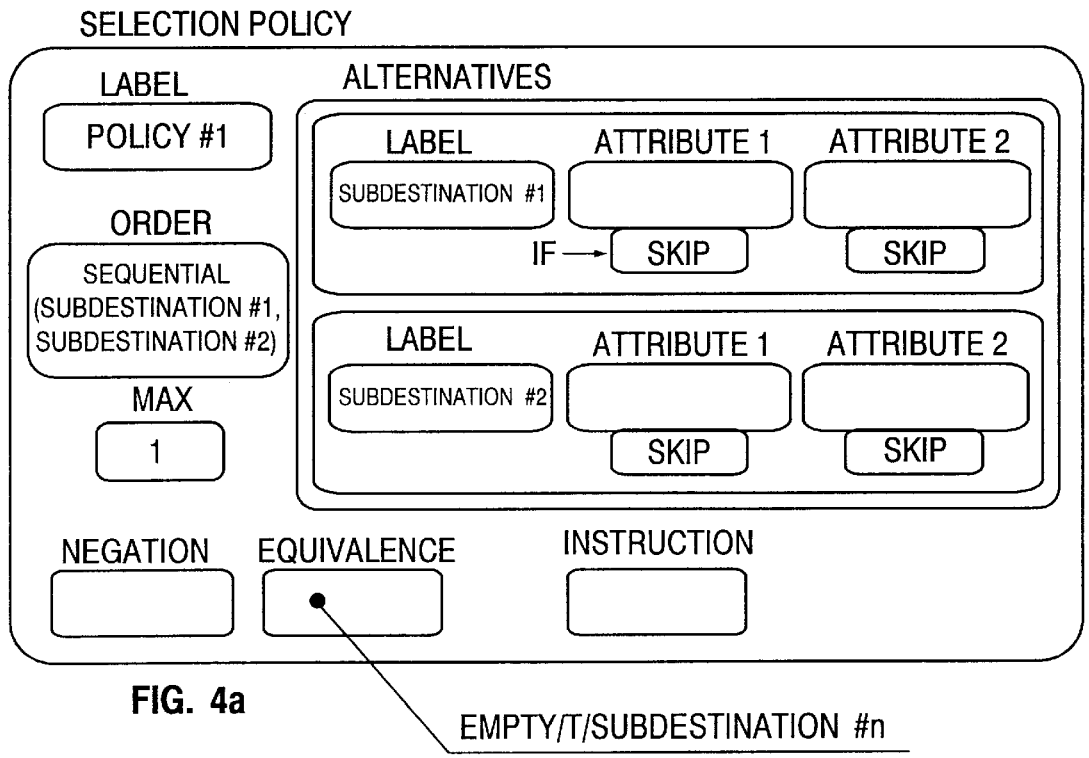
FIG. 4a illustrates a selection policy to be used in a selection machine.

FIG. 4a discloses one possible selection policy object and the elements related thereto. The selection policy comprises a set of alternatives that are in the example case of FIG. 4a subdestinations (subdestination #1 and subdestination #2) of which each has an attribute set of its own (a single attribute containing an instruction field IF, as shown in the figure and described above, informing how to proceed when the matching fails.)

As well as the attribute, the selection policy also has a name (e.g. policy #1 indicated in the label) and three control fields: negation, equivalence and instruction field. The operation of the negation and instruction fields is similar to that in the attribute, that is, the result of the selection policy can be converted by means of negation and by means of the instruction field it is informed what will be done when the selection policy fails; if the routing is to be ended in a failure or if the next selection policy is to be selected from among the available selection policies. (When the routing is ended in a failure, the value "failure" (F) is returned to the call control block as a result.)

The equivalence field, on the other hand, is somewhat different from what is disclosed above. The equivalence field has three possible values in the attribute: "empty", T or F, but in the selection policy the possible values are "empty", F or "alternative" (i.e. some subdestination in this example). If the value of the equivalence field is F, the selection policy fail will fail. If the value of the equivalence field is "alternative", the selection policy always returns said alternative as a result (i.e. a specified subdestination in this example). If the value of the equivalence field is F and the value of the negation field is T, the selection policy will set an alarm and return the value "failure" (F) as a result.

The selection policy also comprises an order field the content of which determines the order in which the alternatives (subdestinations) are examined and a field showing the maximum number of retries indicated with the reference MAX. The value of this field informs how many times the selection policy can try to select a new alternative during the same call. If there are e.g. three alternatives, the order is sequential and the value of the field MAX M=1, it means that the third alternative will never be selected for testing.

Figure 4B:
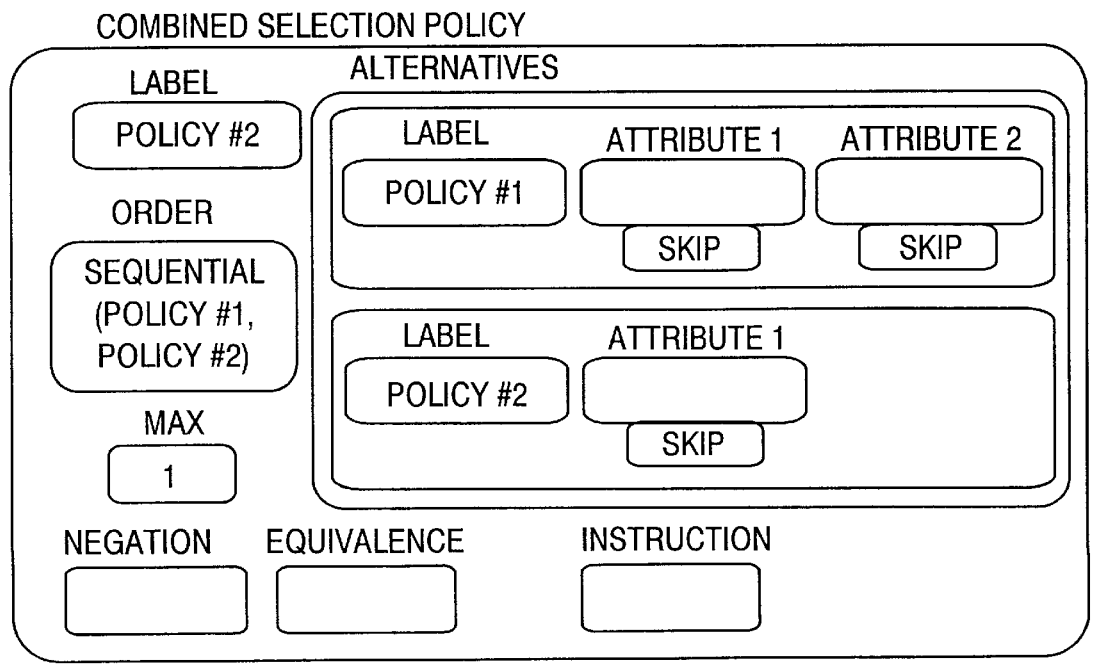
FIG. 4b illustrates a combined selection policy to be used in a selection machine.

The selection policy can also form a combined object. This is carried out by combining e.g. several selection policies into one as two selection policies (policy #1 and policy #2) are combined in FIG. 4b.

Figure 4C:
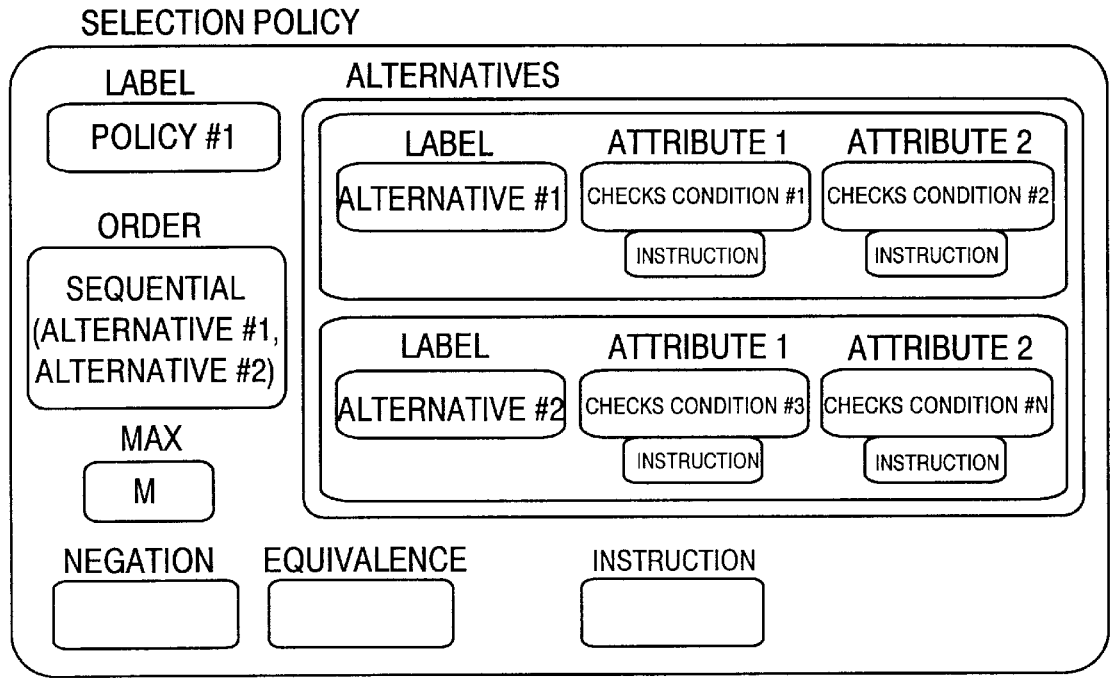
FIG. 4c illustrates a selection policy in its general form.

FIG. 4c again shows the selection policy in its general form in which case it comprises several alternatives which include a set of attributes, each having a certain condition which is checked and an instruction ("skip"/"stop") on what to do when the checking fails. It should be noted that the alternative can be e.g. a subdestination or it can be another selection policy that has its own alternatives each of which can be e.g. a subdestination or another selection policy that again has its own alternatives, etc. This way the desired selection policies can be "chained" in sequence.

The selection policy chooses the first alternative (according to the order field) and matches each attribute with a corresponding call attribute. If all the matchings are successful, the label of the alternative (subdestination) is returned as a selection result. If some matching fails, the process moves onto the next alternative (again according to the order field) or the routing process is interrupted with a failure. If the chosen alternative is another selection policy, it will not be started until all the attributes associated with it have been matched successfully.

Figure 5:
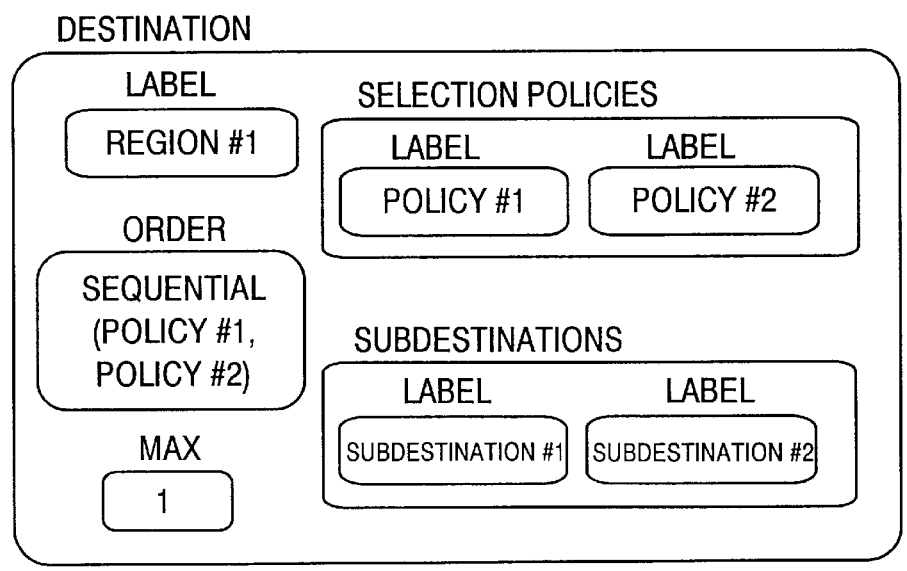
FIG. 5 illustrates a destination to be used in a selection machine.

The destination (FIG. 5) containing a set of selection policies and a set of alternatives (subdestinations) is on the highest level in the hierarchy of the route selector machine according to the invention. The destination also contains an order field indicating the order in which the selection policies are selected and the field MAX informing the maximum number of retries. The selection policy may be directed only to those alternatives (subdestinations) that are associated with the destination, wherefore the destination also contains information on the alternatives connected thereto (as was put forth already in connection with FIG. 1).

The destination is not necessary for it can be left out from the hierarchy of the route selector machine according to the invention.

As appears from what is disclosed above, the components (attribute, selection policy and possible destination) of the route selector machine are of a similar structure.

Figure 6:
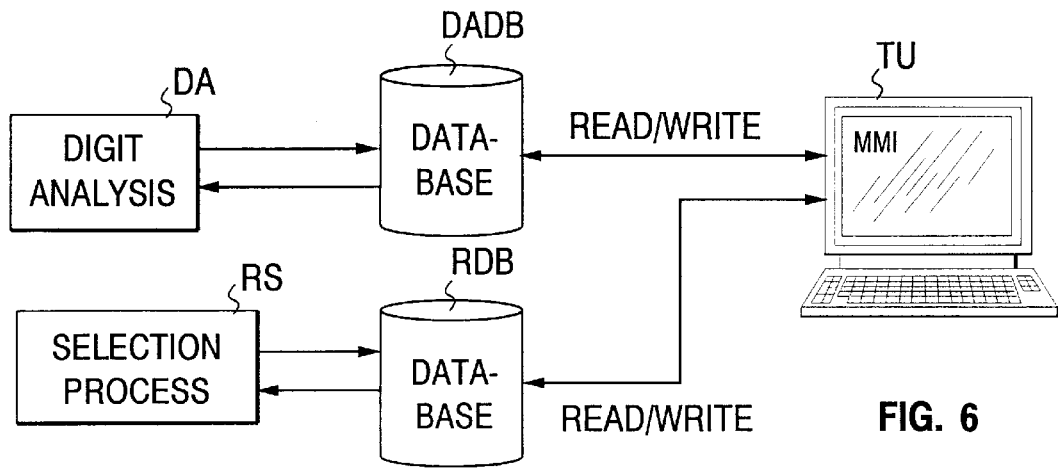
FIG. 6 shows the elements by means of which the operator can create the system according to the invention and use it.

FIG. 6 illustrates in which way an operator can work with the system according to the invention. A database DADB is connected to the digit analysis block DA, the database containing the analysis trees used in digit analyses. A routing database RDB is connected to the selection block RS, the database containing in principle all the information needed for implementing the method according to the invention. (This information comprises in addition to the destinations, the subdestinations (alternatives), the attributes and the selection policies shown above, the identifiers of the services provided for subscribers and pointers to a subscriber database (which are needed for terminating call attempts)).

The operator's terminal unit TU forms a user interface MMI (Man Machine Interface) between the routing system and the operator. (MML language can be used as the command language, the I/O syntax of which language is specified in CCITT recommendations Z.317–Z.341.) The operator can carry out read/write operations via the terminal unit from the database/to the databases DADB and RDB and thus by using the "building blocks" of the invention, form a routing strategy suitable for local conditions. The maintenance of the whole system is carried out via the MMI user interface, the desired attributes are associated with different alternatives and the desired selection policies and orders are put into use for routing, for example. (Maintenance functions include e.g. advanced search functions for searching the attributes supplied by the manufacturer of the exchange on the basis of different keys, such as attribute type.)

In the following, the operation of the route selector machine having the model described above will be illustrated by examples showing in what way the route selector machine operates in a simple example case of FIG. 7 in which three outgoing connections $R_1$, $R_2$ and $R_3$ and also a connection ($A_8$) to the voice announcement service are possible subdestinations at the local exchange 61. Before that some possible attributes on a single subdestination are described. In the following, the names of these attributes are indicated in block capitals.

COUNTER is an attribute the data of which comprises a predetermined threshold value (integer) and an internal counter the starting value of which is zero. Whenever a matching is done, the value of the counter is increased by one. When the counter reaches its upper limit (e.g. 10), the matching will fail (the matching is successful with other values) and the counter is set to zero. (For example, traffic filtering can be done in this way.)

TIME LIMIT is an attribute that enables routing dependent on the time of the day. Its data comprises a starting time and the duration. The matching will succeed if the local time of the exchange node is within a range in which the lower limit is the starting time and the upper limit is the sum of the starting time and the duration.

BARRED is an attribute the (Boolean) data of which may either be true or false. This data is the result of matching. The attribute is useful for turning things off.

SATELLITE CONNECTION (which is also indicated by the reference SC below) is an attribute with either the value "true" (said subdestination leads to the satellite connection) or "false" (said subdestination does not lead to the satellite connection). As the satellite connection is an expensive portion of the whole data link, their number on one speech connection should be limited (e.g. to one). If a call is transmitted via a satellite connection, the data on it is stored into the call data that is transmitted from one node to another. When the value of the attribute is "true", the matching operation checks the call data and if the number of the carried satellite connections has reached its permitted upper limit, the matching will fail.

DIRECT TRAFFIC AND OVERFLOW TRAFFIC

If a call belongs to overflowing traffic, there is a notification of this in its data. If the call shifts in a node from the primary subdestination to an alternative destination (whereby it will at the same time become overflowing traffic), the number of skips (a skip carried out on the basis of the value "skip" in the instruction field) will be greater than zero. If either of these conditions is true, the matching of the DIRECT TRAFFIC attribute will fail. The OVERFLOW TRAFFIC attribute can be derived from the DIRECT TRAFFIC attribute by negation.

CONGESTION is an attribute with either the value "true" or "false". Several destinations can lead to the same physical route. The calls to these destinations compete for the same circuits; the number of available circuits sets an upper limit to the maximum number of simultaneous calls. The matching operation of this attribute checks whether it is any more possible to put a circuit into use or it can check the traffic situation at the next exchange, for example.

TRUNK RESERVATION PARAMETER (TRP)

When the network is (over)loaded, direct traffic needs to have priority over overflow traffic. This can be made by reserving a given number of available circuits for direct traffic. The data of this attribute comprises an integer corresponding to the number of the reserved circuits. The matching operation checks for the overflow traffic if the number of idle circuits is greater than said integer. If it is not, the matching will fail.

SIGNALLING

This attribute describes signalling used by the nodes. Some known ways of signalling are N2 (decadic signalling), R2 (multifrequency signalling), TUP (Telephone User Part, based on common channel signalling) and ISUP (ISDN User Part, based on common channel signalling). The data of the SIGNALLING attribute communicates the used signalling. The matching will fail if the signalling used cannot attend to the signalling required by the call attempt (e.g. ISUP is required and R2 is in use).

TRANSMISSION MEDIUM TYPE (TMT)

This attribute describes the properties of a transmission medium, such as the maximum bit rate. Transmission media can be classified into three classes: digital paths, audio paths or speech paths. The type of the required transmission medium is stored into call data. A call requiring a digital transmission medium cannot use any other type, a call provided with an audio requirement can use digital or audio medium and a call provided with a speech requirement can use any type of transmission medium. The matching will fail if the type of transmission medium related to the call attempt requires a better transmission medium than what is used on said path.

TEST TRAFFIC and PAYLOAD TRAFFIC

The operator can specify for test purposes some of the incoming circuits as "test traffic sources". The call attempts originating from the test traffic sources have a "test traffic" flag in the call attempt data. The matching will be successful if there is a "test traffic" flag in the call attempt data, otherwise the matching will fail. The PAYLOAD TRAFFIC attribute can be derived from the TEST TRAFFIC attribute by negation.

CALLING ADDRESS and CALLED ADDRESS

The data of the CALLING ADDRESS attribute includes a pointer to a digit analysis tree in which a group of telephone numbers are stored. The matching of this attribute succeeds if any of the stored telephone numbers is either a prefix of the calling address in the call attempt data or the same as the calling address in the call attempt data. The CALLED ADDRESS attribute differs from the CALLING ADDRESS attribute in that its matching operation compares the numbers stored into the analysis tree with the called address in the call attempt data.

AREA CODE

An area code is a digit sequence the length of which varies from one country to another. The matching operation of the AREA CODE attribute compares the digit sequence with the caller's area code (digit sequence) which is stored into the call attempt data. The matching will succeed if all the stored numbers (of the call attempt) are the same as the corresponding number in the data of the attribute (that is, the digit sequences are the same).

As can be seen from the above, a given matching operation is associated with each attribute and it depends on the attribute in question which of the matching operations the selection process calls at each time.

Figure 7:
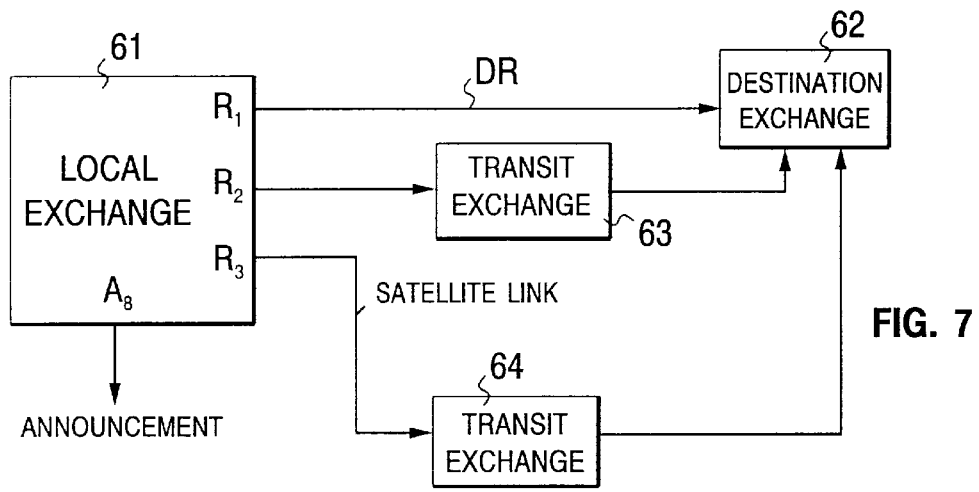
FIG. 7 shows routing possibilities in a network comprising four exchanges.

It is assumed that a call should be connected from the local exchange 61 of FIG. 7 to a destination exchange 62 to which it can be directed via a direct route DR or alternatively through a first transit exchange 63 or (through a satellite link and) a second transit exchange 64. Four different subdestinations $R_1$, $R_2$, $R_3$ (outgoing subdestinations) and $A_s$, (a voice announcement subdestination) are then combined at the local exchange 61 into one destination $D_1$. The subdestination $R_1$, has the attributes TMT=speech and SIGNALLING=$R_2$, the TMT attribute of the subdestination $R_2$ has the value "audio" and the subdestination $R_3$ has the attributes TMT=digital and SIGNALLING=ISUP and it leads to a satellite connection. The attributes are shown in the table below.

| Sub-destination | TMT | SIGNALLING | SATELLITE CONNECTION |
|---|---|---|---|
| $R_1$ | speech | R2 | no |
| $R_2$ | audio | R2 | no |
| $R_3$ | digital | ISUP | yes |

Figure 8:
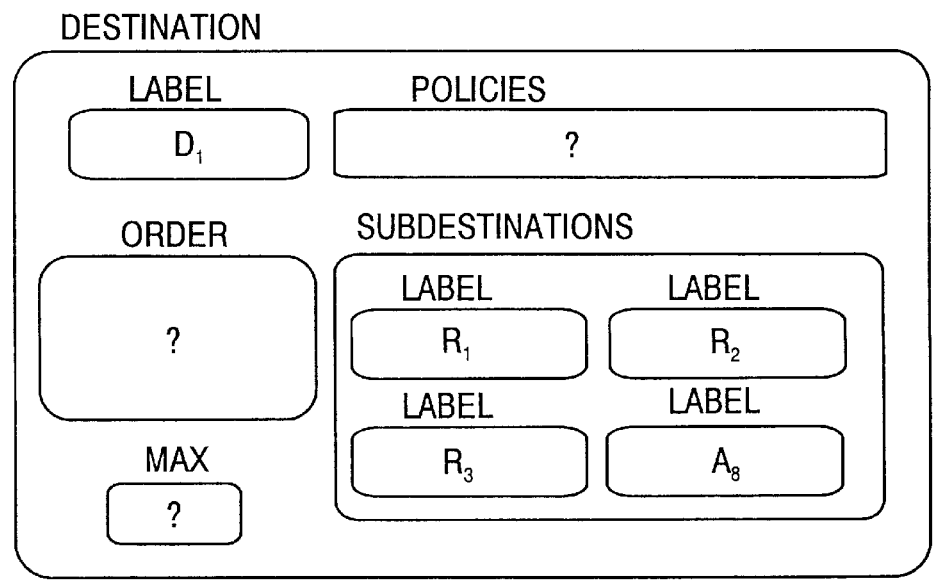
FIG. 8 illustrates alternatives in the destination in a network according to FIG. 7.

In addition to the above-described alternatives, the destination should have one or more selection policies which have been left open in FIG. 8. In the following, different selection policies are added to the use of the local exchange 61.

Figure 9:
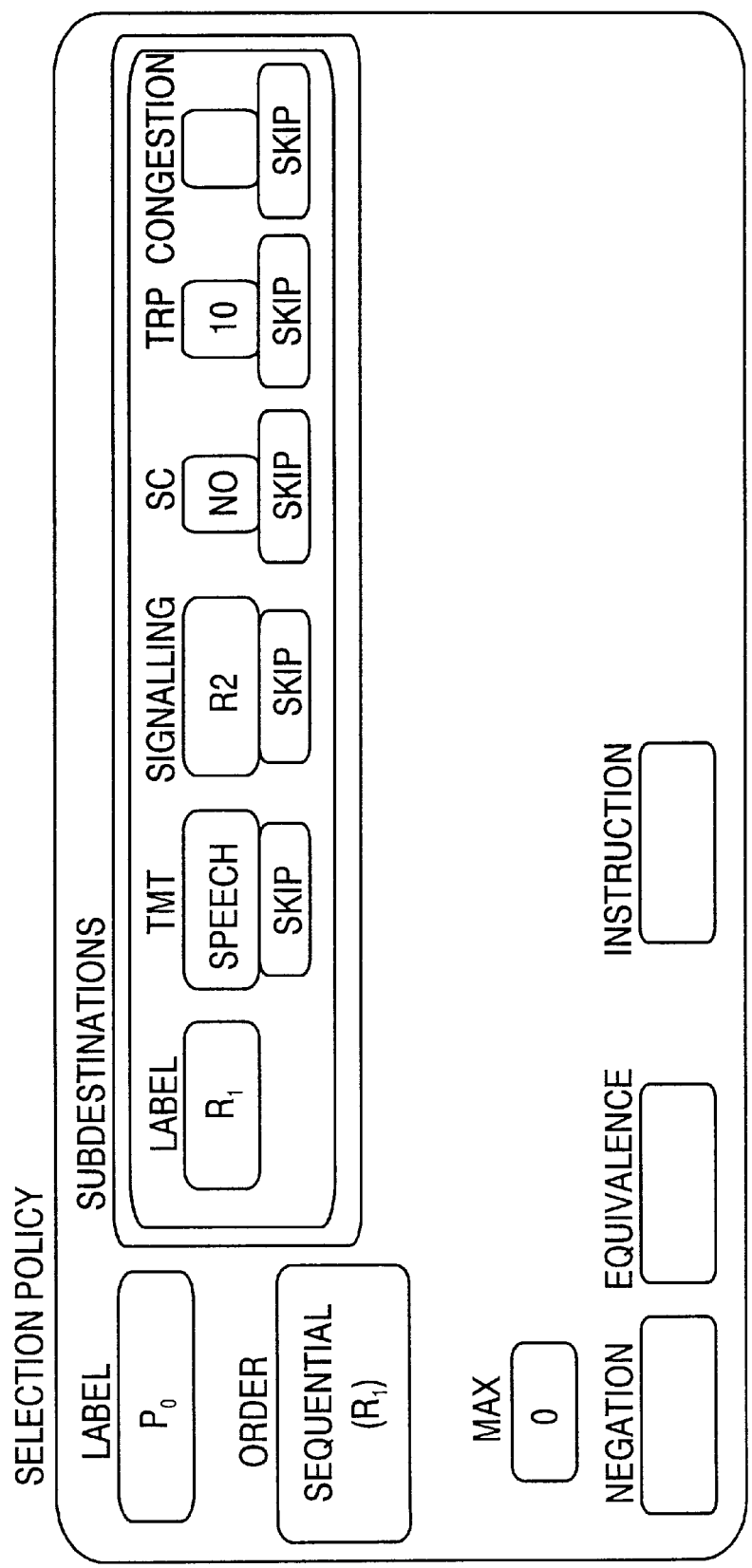
FIG. 9 illustrates one possible selection policy that can be used in a network according to FIG. 7.
Figure 10:
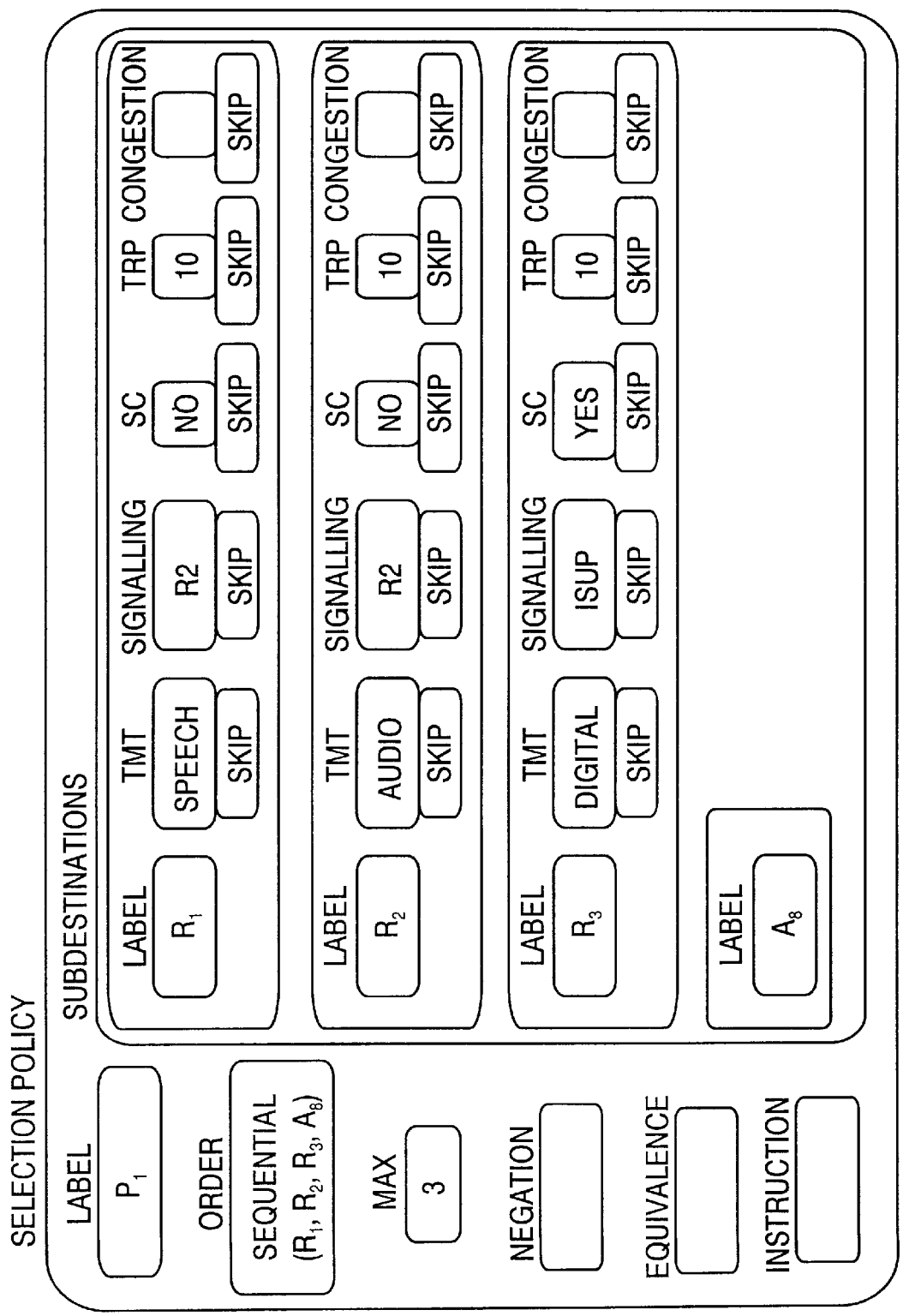
FIG. 10 illustrates another possible selection policy that can be used in a network according to FIG. 7.

A simple selection policy $P_0$ as in FIG. 9 with which the most direct subdestination ($R_1$) is tested and a selection policy $P_1$ which tests all the possible subdestinations in sequence are presented first. It should be noted that the selection policy $P_1$ can be adjusted to act exactly as the selection policy $P_0$ by placing zero as the number of retries in the field MAX or alternatively by changing the values "stop" instead of the values "skip" into the attribute instruction fields of the subdestination $R_1$.

Figure 11:
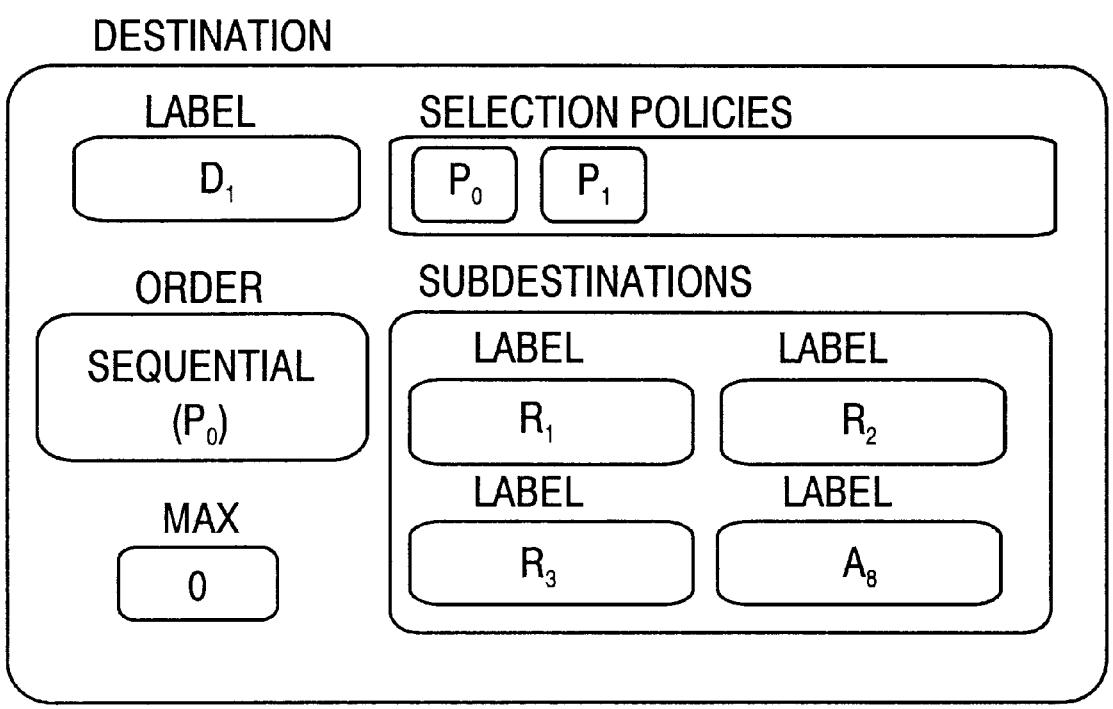
FIG. 11 illustrates one possible destination that can be used in a network according to FIG. 7.

Now the destination can be set into action. For example, only direct routing is implemented with the configuration of FIG. 11. If the matching of some attribute of the subdestination $R_1$ fails, the whole routing will fail and the call will be released. By replacing $P_0$ by the value $P_1$ in the order field of the destination, an automatic alternative routing is effected. If the matching of all the attributes of the subdestination $R_1$ succeeds, the call will be routed directly. If the matching of some attribute fails, the other alternatives are tested in the order $R_2$, $R_3$ and $A_s$. If the selection reaches as far as $A_s$, the subscriber will receive a voice announcement (e.g. "all lines are busy").

In the following it is shown in what way the action of routing can be changed by adding attributes to the subdestinations.

Figure 12:
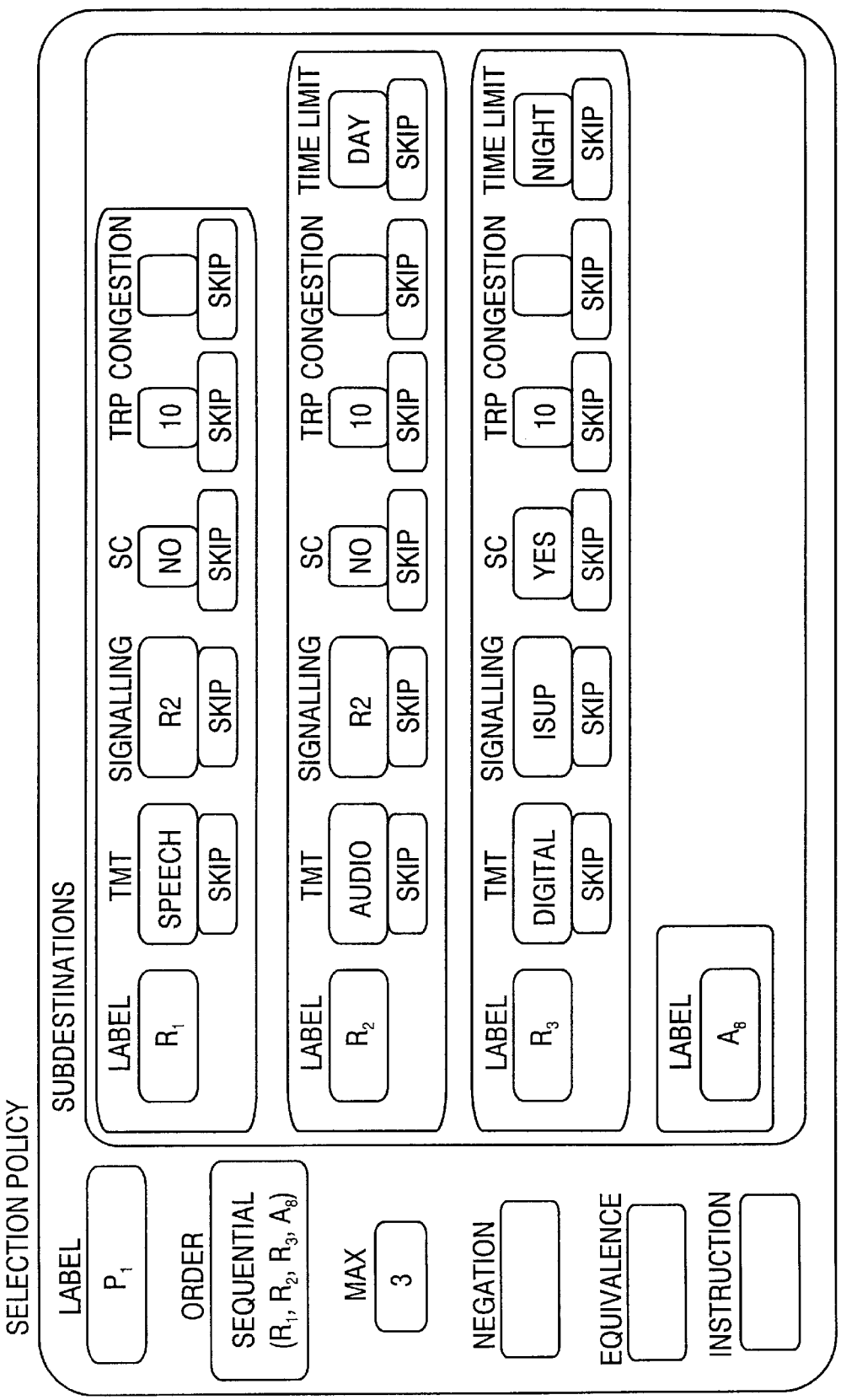
FIG. 12 illustrates a selection policy formed by modifying the selection policy shown in FIG. 10.

In case e.g. a time-controlled routing is to be effected so that the subdestination $R_2$ is used during the day and the subdestination $R_3$ at night time, for example, this behaviour can easily be implemented to the route selector machine by adding the TIME LIMIT attribute as the attribute of both these subdestinations. This selection policy is illustrated in FIG. 12. This addition has changed the operation of the route selector machine so that during the day the only alternatives (in addition to the direct alternative) are $R_2$ and $A_s$ and at night time $R_3$ and $A_s$.

Figure 13:
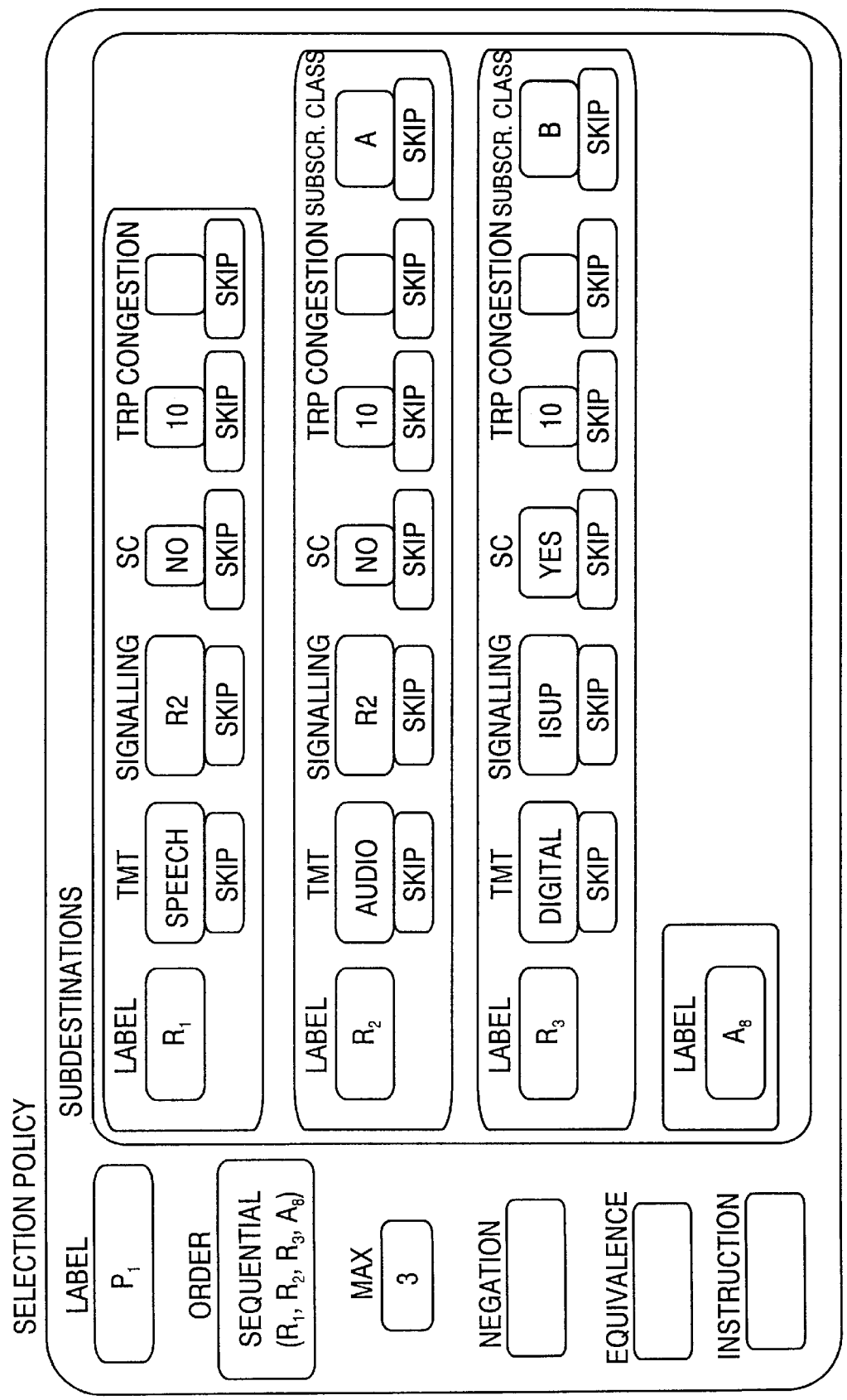
FIG. 13 illustrates a selection policy formed by modifying the selection policy shown in FIG. 10.

In case some of the subscribers are to be privileged for example so that only privileged subscribers are routed through the subdestinations $R_2$ and $R_3$, a new attribute SUBSCRIBER CLASS has to added whose data may only have the value A or B, for example (it is presumed that B is greater than A). The addition is made into the attribute list of said subdestinations and it is illustrated in FIG. 13. The matching will be successful if the value of said attribute is greater than or equal to the subscriber class (which is stored into the call attempt data) of the calling subscriber, that is, in the example of FIG. 13 the matching is successful on the subdestination $R_2$ for subscribers of class A and B, but on the subdestination $R_3$ for subscribers of class B.

Sometimes it may be necessary to restrict the frequency of calls temporarily. An attribute attending to the restriction is needed for this purpose and the data of the attribute may comprise e.g. the starting time, the duration, the maximum number of calls and a time unit during which said number of calls is permitted. If it is assumed that no more than 5 calls a minute may be transmitted to a given subdestination during the next two hours, the duration is 2 hours, the maximum number of calls 5 and the time unit 1 minute. It is assumed that the matching of this RESTRICTION attribute is performed once during the call, whereby the time of the latest matching corresponds to the time of the latest call attempt. The RESTRICTION attribute stores the time of the latest matching into its internal data. The matching will fail if the following two conditions (a) and (b) hold true:

(a) 0<(current time−starting time)<duration (b) (current time−starting time) DIV(TU/MC)=(last call time−starting time) DIV(TU/MC), wherein TU is said time unit, MC is the maximum number of calls and DIV is an operator providing only an integer part of the division.

Figure 14:
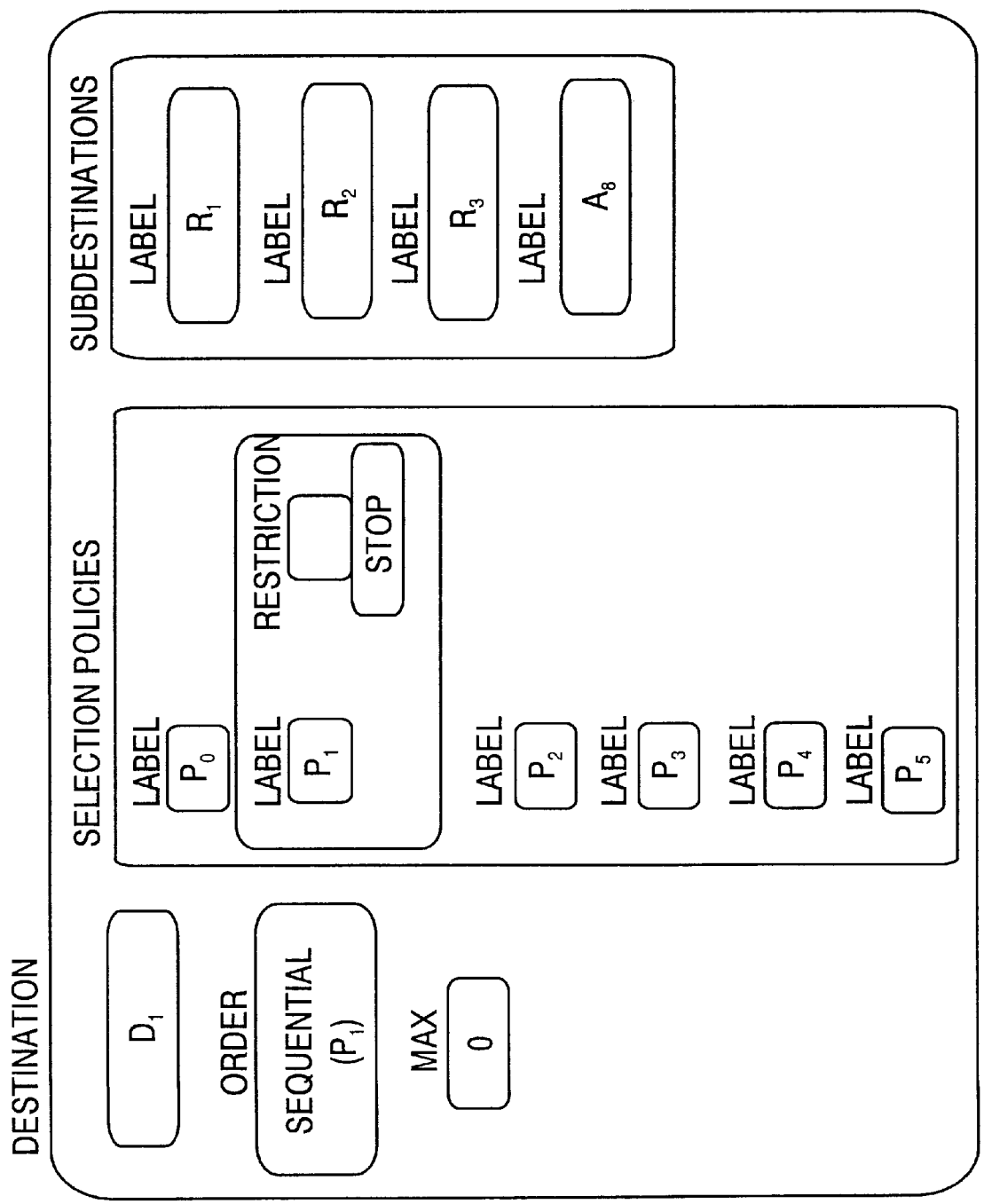
FIG. 14 illustrates the addition of a call restriction function to the routing functions.

FIG. 14 illustrates the implementation of the restriction of calls. When the selection policy $P_1$ is selected, the matching of the RESTRICTION attribute associated with it is first carried out. If the matching fails, the routing will also fail (as the instruction is "stop"). As the number of the attributes permitted by the attribute is restricted (e.g. at most 5 matchings/minute during the next 2 hours), the number of call attempts leading to the destination should also be restricted.

Some other possible selection policies are described next so as to be able to use them in the examples shown later.

FIG. 15 shows a selection policy $P_2$ which consists only of giving a voice announcement (subdestination $A_s$).

FIG. 16 shows a selection policy $P_3$ in which the digital subdestination $R_3$ is the only alternative.

Figure 17:
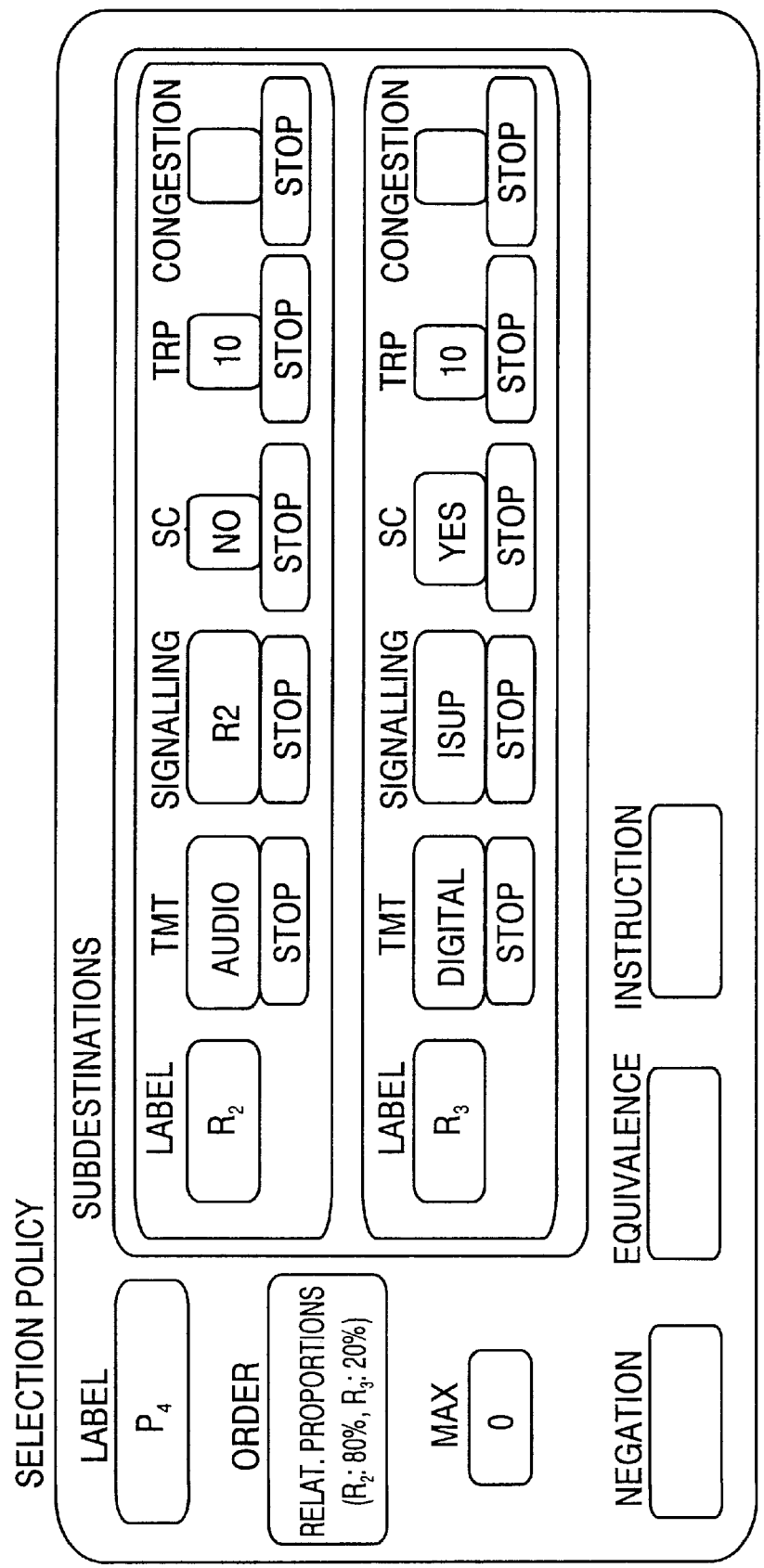
FIG. 17 illustrates routing in which two different subdestinations of FIG. 7 are used in given percentage proportions.

FIG. 17 shows a policy $P_4$ in which the set of alternatives consists of the subdestinations $R_2$ and $R_3$. The order is determined in accordance with relative proportions in such a manner that the subdestination $R_2$ is selected for 80% of the calls and the subdestination $R_3$ for 20% of the calls. (The default value of the instruction is "stop" as the retries would distort the percentage proportions. The value zero of the field MAX works in the same way).

FIG. 18 shows a combined selection policy $P_5$ combining the selection policies $P_0$, $P_4$ and $P_2$. The order is sequential. In case the selection policy $P_0$ fails, the call cannot be routed directly, but the selection policy $P_4$ is started and the subdestinations $R_2$ and $R_3$ are tested. If the policy $P_4$ fails, the policy $P_2$ is started, whereby the caller receives a voice announcement ("all lines are busy").

It may be necessary to provide a special treatment for certain calls. In the following example it is assumed that the subdestination $R_1$, is owned by a local telephone company, the subdestination $R_2$ belongs to the first network operator and that the distribution 80/20 according to the selection policy $P_4$ represents the profit distribution between the companies. When having used the destination ($R_1$) for some time, the telephone company starts receiving complaints from ISDN subscribers; the probability that the call would meet with a congestion situation is too great. After this, the telephone company makes an agreement with the network operator on the following procedure:

1. If the required signalling is not ISUP (that is, it is not an ISDN call), the selection policy $P_4$ is used.

2. If the required signalling is ISUP (that is, it is an ISDN call), the ISUP subdestination ($R_3$) is tested first.

3. If the subdestination $R_3$ is selected and some of its attributes will lead to a failure, the selection process is aborted and it results in a failure.

Without evaluating the rationality of the policy described above, it should be examined how a local telephone company is able to fulfil the requirements mentioned above. FIG. 19 shows a combined selection policy $P_6$ fulfilling these requirements. The selection policy $P_3$ now has only one attribute whose matching will be successful only when the required signalling is ISUP. This is achieved by setting TUP (matching all other requirements except the ISUP requirement) as the data of the attribute (SIGNALLING) and by carrying out a negation for the matching result. If the required signalling is not ISUP, $P_3$ is skipped as the instruction of the attribute is "skip". If $P_3$ has been selected and the matching of the attribute relating to the alternative in it fails, the selection will end in a failure as the instruction of $P_3$ is "stop".

The example described above shows how the operation of the route selector machine and the principles of routing can be changed in a very simple way by using the model according to the invention. Generally speaking, it could be stated that very flexible basic functions will be obtained by modifying the set of alternatives, the conditions (or the data in the condition, such as the time of the day) and/or the order in which the alternatives are selected for testing. The possibilities for change will be varied and flexible when this is combined with a possibility to employ negation, equivalence and instruction field and use another selection policy as an alternative.

Figure 20:
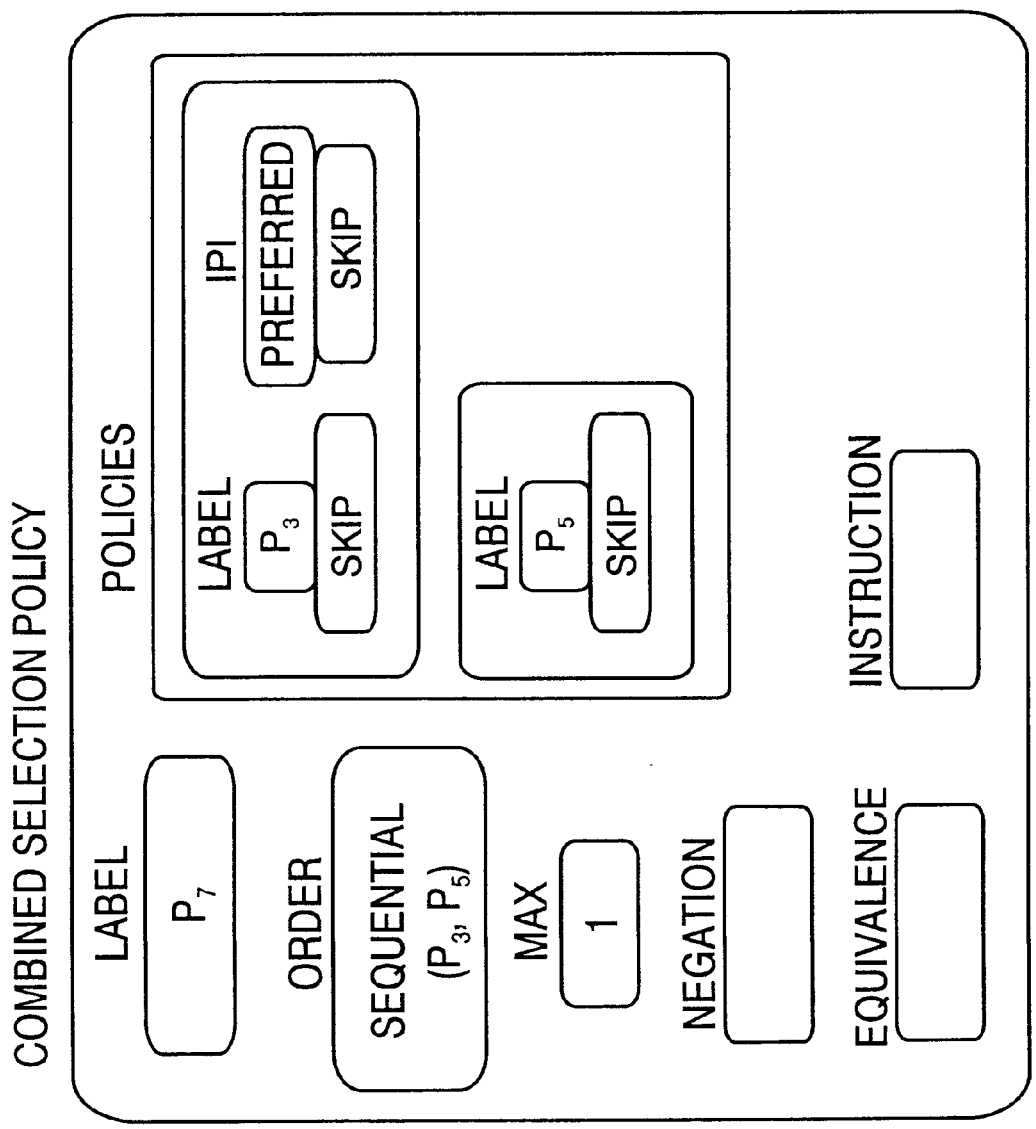
FIG. 20 illustrates another routing process in which a special service is offered for ISDN calls by means of an additional attribute.

In accordance with the recommendations issued by ITU-T, a subdestination provided with an ISUP signalling should first be hunted for all the calls that have an ISUP PREFERRED indicator. This can be done by a new attribute IPI (ISUP Preference Indicator), for example, the data of which can be "required", "preferred" or "not required" (it is also assumed that the order between the indicators corresponds e.g. to the values "required"=3, "preferred"=2 and "not required"=1). The matching will succeed if the value of the corresponding indicator (call attribute) of the call attempt is equal to or smaller than the value of the IPI attribute specified in the route selector machine. FIG. 20 illustrate the use of the IPI attribute.

The manufacturer of the exchange may provide the operator with specified attributes and specified selection policies and by combining these "building blocks" in different ways the operator may find the desired manner of routing at each time.

In the examples shown above, a correct alternative was selected as soon as it was found, but the method can also be applied in such a manner that the correct alternative is selected only after all the alternatives have been checked (although this method is slower). The alternative may be given e.g. certain weight values, whereby the one with the greatest weight value is selected from among the alternatives corresponding to successful matchings.

It should further be noted that the selection of the correct alternative may be carried out, except at exchanges, also at a database located farther away, such as the switching control point SCP of the intelligent network. In this case at least the selection block RS (FIG. 2a) is in the SCP. At the call set-up stage the call control block CC sends an inquiry to the SCP and the selection is carried out in the SCP from which the result (subdestination) is returned (via the signalling network) to the node in which the call control block is located. The solution can be even more decentralized for example so that simpler selection policies can be located at the exchange and at least some of these selection policies may lead to another selection policy which is stored into the SCP. Although the invention concerns traffic routing in a node of a telecommunication network, some of the routing operations may be carried out outside the node.

Although the invention is above explained with reference to the examples according to the accompanying drawings, it is evident that the invention is not restricted thereto, but it can be modified within the scope of the inventive idea disclosed above and in the appended claims. As was mentioned above, the same solution could also be used for other selections than for selecting the subdestination from among several different alternative subdestinations, for example, for selecting an analysis tree from among several alternative analysis trees and for selecting a circuit from among several alternative circuits. When above and in the appended claims it is referred to a set of attributes or a set of selection policies, it is to be understood that it also comprises a set in which there is only one or no attribute/selection policy.

What is claimed is:

1. A method for routing traffic in a node (61 . . . 64) of a telecommunications network in which method the node receives traffic units to each of which is connected given call attributes on the basis of which the routing is carried out, a suitable alternative is selected from among several possible traffic control alternatives ($R_1$–$R_3$, $A_8$), whereby a set of attributes is allocated to each alternative for the selection and an attribute is matched with the call attribute corresponding to it when testing the suitability of said alternative for said traffic unit, characterized in that a set of selection policies ($P_0$ . . . $P_6$) and the order in which they are used are specified for the selection, each selection policy specifying at least the available alternatives and the order in which said alternatives are selected for testing, whereby the suitability of the alternatives is tested in the order specified by the selection policy, wherein a set of attributes is also associated with the selection policy and when it is time to use the selection policy, each attribute is matched with the call attribute corresponding to it, whereby it depends on the results of the matchings if said selection policy is started, and when said set of attributes is empty, the selection policy is started as soon as it is time to use it.

2. A method according to claim 1, characterized in that another selection policy is used as one alternative specified by the selection policy.

3. A method for routing traffic in a node (61 . . . 64) of a telecommunications network in which method the node receives traffic units to each of which is connected given call attributes on the basis of which the routing is carried out, a suitable alternative is selected from among several possible traffic control alternatives ($R_1$–$R_3$, $A_8$), whereby a set of attributes is allocated to each alternative for the selection and an attribute is matched with the call attribute corresponding to it when testing the suitability of said alternative for said traffic unit, characterized in that a set of selection policies ($P_0$ . . . $P_6$) and the order in which they are used are specified for the selection, each selection policy specifying at least the available alternatives and the order in which said alternatives are selected for testing, whereby the suitability of the alternatives is tested in the order specified by the selection policy, wherein a control field is associated with the single attribute, the value of which field determines how the selection process will proceed when a given predetermined result is obtained from the matching of said attribute.

4. A method according to claim 3, characterized in that the control field is also associated with the selection policy, the value of which field determines how the selection process will proceed when a given predetermined result is obtained from said selection policy.

5. A method for routing traffic in a node (61 . . . 64) of a telecommunications network in which method the node receives traffic units to each of which is connected given call attributes on the basis of which the routing is carried out, a suitable alternative is selected from among several possible traffic control alternatives ($R_1$–$R_3$, $A_8$), whereby a set of attributes is allocated to each alternative for the selection and an attribute is matched with the call attribute corresponding to it when testing the suitability of said alternative for said traffic unit, characterized in that a set of selection policies ($P_0$ . . . $P_6$) and the order in which they are used are specified for the selection, each selection policy specifying at least the available alternatives and the order in which said alternatives are selected for testing, whereby the suitability of the alternatives is tested in the order specified by the selection policy, wherein a first control field is associated with the single attribute by means of which field the result of the matching can be forced to be as desired, and a second control field, by means of which negation can be carried out for the result of the matching.

6. A method according to claim 5, characterized in that the first control field is also associated with the selection policy, by means of which field the result of the selection policy can be forced to be as desired, and the second control field by means of which negation can be carried out for the result of the selection policy.

7. A method for routing traffic in a node (61 . . . 64) of a telecommunications network in which method the node receives traffic units to each of which is connected given call attributes on the basis of which the routing is carried out, a suitable alternative is selected from among several possible traffic control alternatives ($R_1$–$R_3$, $A_8$), whereby a set of attributes is allocated to each alternative for the selection and an attribute is matched with the call attribute corresponding to it when testing the suitability of said alternative for said traffic unit, characterized in that a set of selection policies ($P_0$ . . . $P_6$) and the order in which they are used are specified for the selection, each selection policy specifying at least the available alternatives and the order in which said alternatives are selected for testing, whereby the suitability of the alternatives is tested in the order specified by the selection policy, wherein an upper limit is determined for how many times a new alternative can be selected for testing.

8. A system for routing traffic in a node of a telecommunication network, routing being based on an incoming traffic unit containing control data related to a call attempt, which system comprises elements (CC) for dividing said control data into several call attributes, elements (DA) for selecting several traffic control alternatives for the traffic unit elements (TU, RDB) with which a set of attributes are allocated to a single alternative, elements (RS) for matching an attribute associated with the alternative and a call attribute, and elements (RS) for selecting one traffic control alternative as a response to the matching result, characterized in that is also comprises elements (TU, RDB) with which a given ordered set of selection policies is allocated for routing, whereby their order determines the order of use of the selection policies, elements (TU, RDB) for allocating an ordered set of alternatives to a single selection policy, whereby the order between the alternatives determines the order in which the alternatives are selected for carrying our said matching.

9. A system according to claim 8, characterized in that it also comprises elements (TU, RDB) for allocating an attribute to a single selection policy, whereby the use of the selection policy at a stage determined by the order of use depends on the matching result of the attribute associated with the selection policy and the corresponding call attribute.

10. A system according to claim 8, characterized in that it also comprises elements (TU, RDB) for forcing the matching result corresponding to the single attribute to be as desired.

11. A system according to claim 8, characterized in that it also comprises elements (TU, RDB) for applying a logical not-operation to the matching result of the single attribute.

12. A system according to claim 8, characterized in that it also comprises elements (TU, RDB) for controlling routing as a response to an unsuccessful matching of the attribute associated with the alternative and the call attribute.

13. A system according to claim 8, characterized in that it also comprises elements (TU, RDB) for determining an upper limit for how many times a new alternative can be selected for testing.

* * * * *